INVENTOR.
Earl Stuart Perkins
BY ... ATTORNEYS

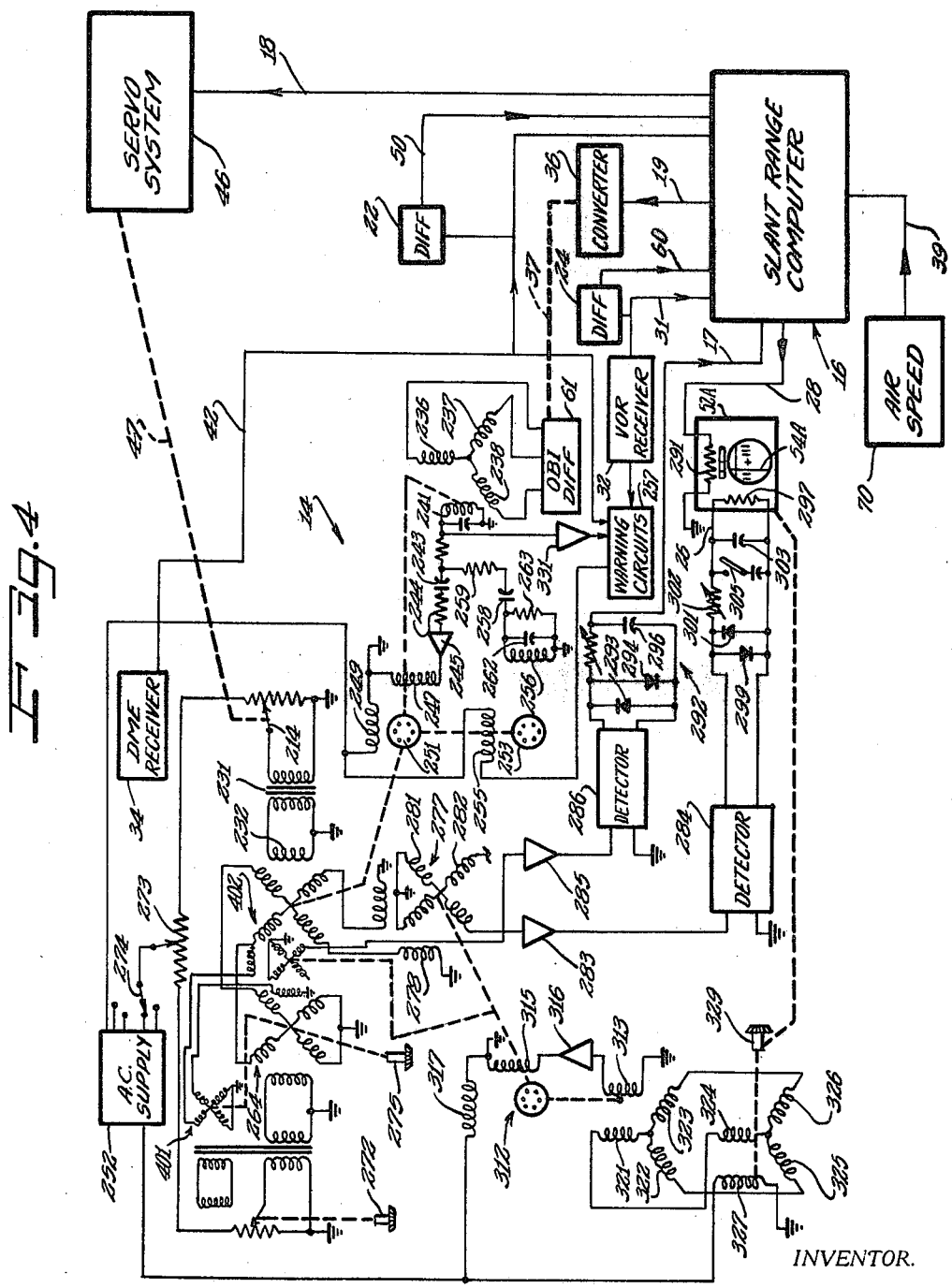

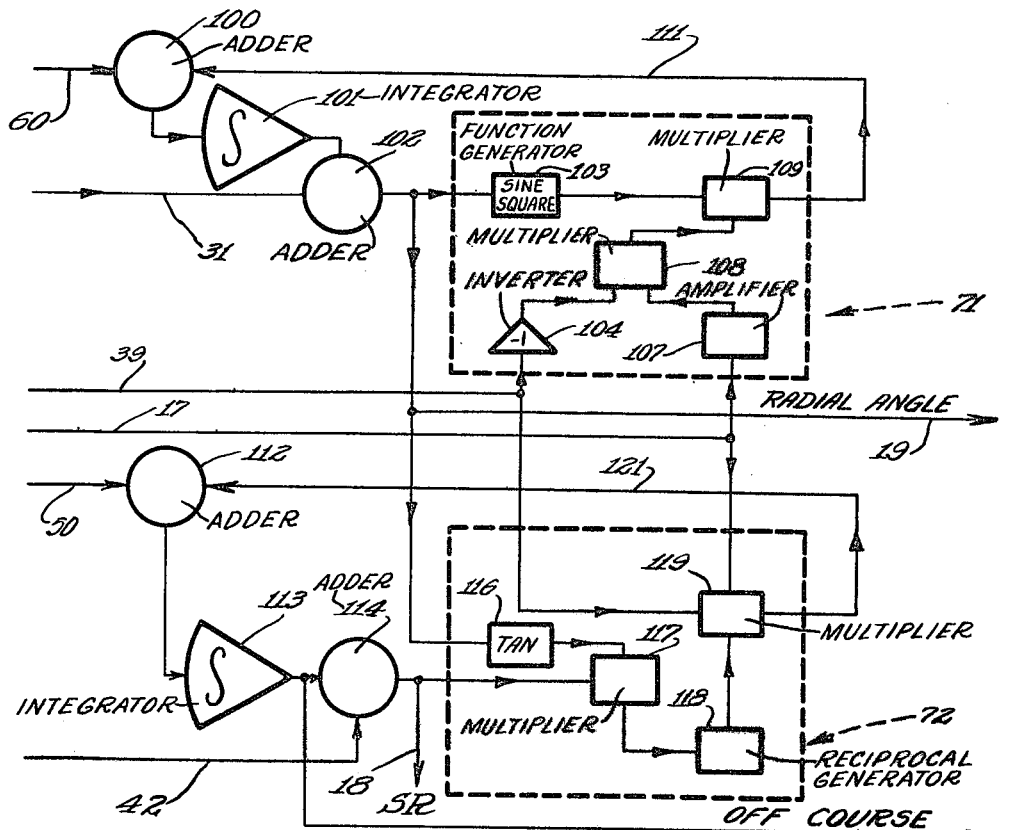

United States Patent Office 3,495,241
Patented Feb. 10, 1970

3,495,241
NAVIGATION SYSTEM FOR CORRECTING SLANT RANGE ERRORS
Earl Stuart Perkins, Oak Brook, Ill., assignor to Butler National Corporation, Minneapolis, Minn., a corporation of Delaware
Filed June 10, 1968, Ser. No. 735,694
Int. Cl. G01s 9/02
U.S. Cl. 343—6
11 Claims

ABSTRACT OF THE DISCLOSURE

In aircraft navigation it is common to use distance measuring equipment to determine the distance between a radio station and the aircraft. Navigation computers which calculate track velocity and position relative to the ground are known. For example, a navigation computer such as shown in my copending application Ser. No. 559,650 entitled "Aircraft Navigation System" now U.S. Patent No. 3,414,901, allows an aircraft to fly to a selected waypoint which has a known distance and bearing from a radio transmitter. A VOR station and a DME station may be located at the fixed ground location and the desired track will be calculated, as shown in detail in application Ser. No. 559,650. Such systems are referred to as offset course computers. The signal obtained from the distance measuring equipment actually measures the slant range from the station on the ground to the aircraft which is above the ground and as the aircraft flies near the station to the waypoint the computed track using the slant range signal will result in a curvilinear path of the aircraft. The present invention eliminates this error by calculating a corrected signal which keeps the aircraft on the desired track and prevents it from "pulling toward the station as it is passed.

CROSS REFERENCE TO RELATED APPLICATIONS

This invention comprises an improvement in the invention disclosed in application entitled "Aircraft Navigation System," Ser. No. 559,650 filed May 31, 1966.

BACKGROUND OF THE INVENTION

Field of the invention

This invention relates in general to aircraft navigation systems and in particular to an offset course computer.

DESCRIPTION OF THE PRIOR ART

Aircraft navigation systems according to the prior art for flying to waypoints which use VOR and distance measuring equipment have had errors when the aircraft is in the vicinity of the transmitting station because the computer utilizes the slant range from the distance measuring equipment on the ground to the aircraft in its computation. For example, if it is desired to fly the aircraft on an offset track of one mile past the station and the aircraft is at an altitude of one mile above the station, it will fly directly over the station because the distance measuring equipment will give a mile indication when it is directly above the station. Although this error may be negligible at great distances from the station, it is to be realized that many aircraft may be utilizing a particular ground station to fly offset courses close to the ground station. Thus, a dangerous situation exists as aircrafts are "pulled" toward the station as they approach the vicinity of the station. It is undesirable to curve toward the station due to the slant range error.

SUMMARY OF THE INVENTION

The present invention provides for slant range correction in an aircraft navigation system to prevent aircraft from flying a curvilinear path close to the station and allows a straight ground track to be selected and flown by an aircraft utilizing the invention. The slant range correction made by the present invention does not utilize altitude input as one of the control parameters but calculates the correct track and assures that the aircraft maintain such a track even in the vicinity of the station.

Other objects, features and advantages of the present invention will be readily apparent from the following detailed description of certain preferred embodiments thereof taken in conjunction with the accompanying drawings.

BRIEF DESCRIPTIONS OF THE DRAWINGS

FIGURE 4 illustrates a navigation system according to this invention with a slant range flight path computer installed;

FIGURE 5 is a detailed view of the slant range flight path computer of this invention; and FIGURE 6 illustrates how the slant range error correction is made.

DESCRIPTION OF THE PREFERRED EMBODIMENTS

Figure 1:
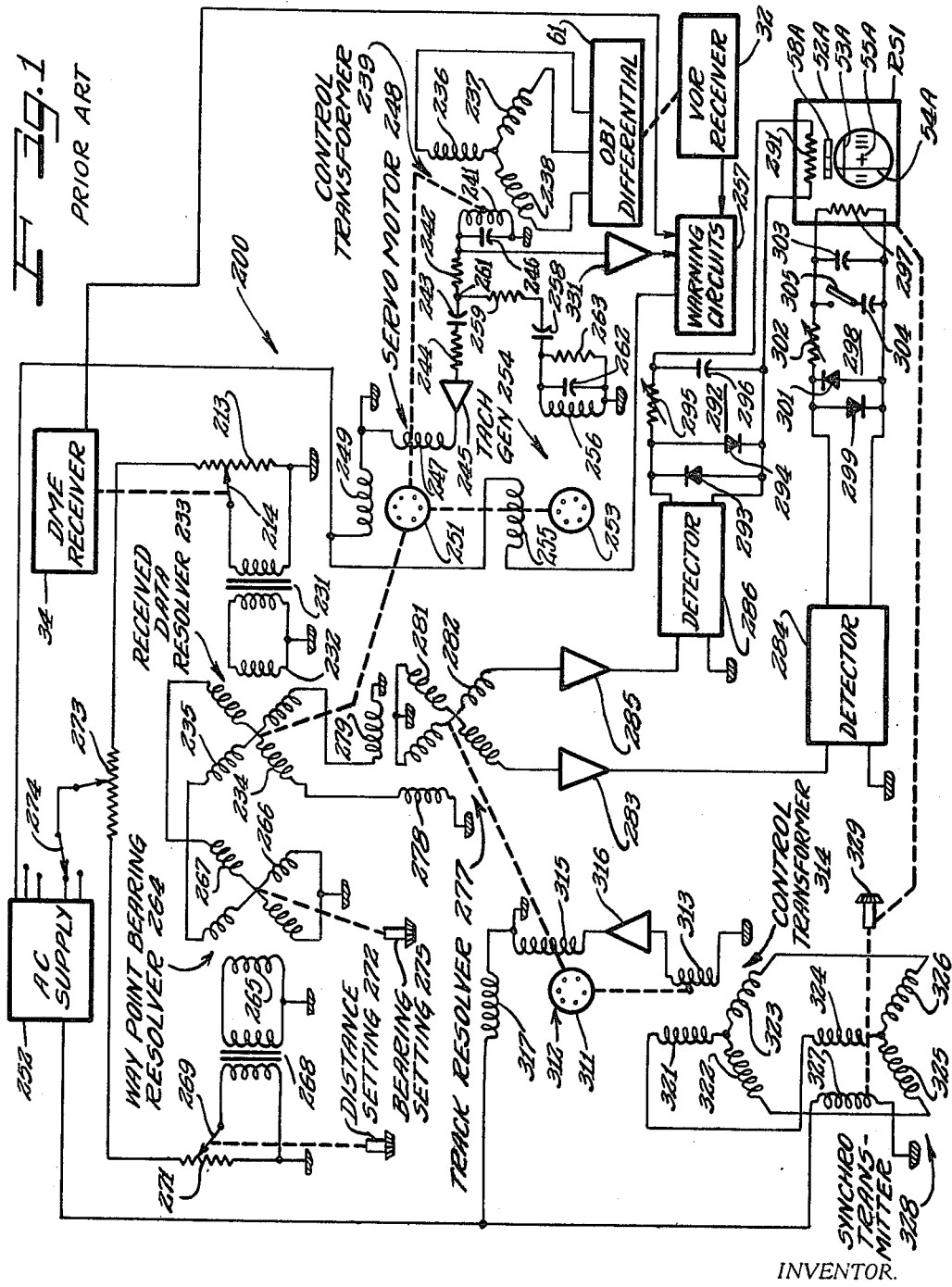
FIGURE 1 illustrates a navigation system according to the prior art.

The problem relating to slant range exists because when an aircraft is flying parallel to a VOR radial and is using rectilinear coordinates computed from Rho-theta information derived from a VORTAC station, the position of the aircraft will vary with distance from the station because of the altitude of the aircraft. For example, if the aircraft's offset track is one mile from the selected radial, upon arriving at a point opposite the station at a one-mile altitude, the aircraft will be directly over the station. In other words, since the range to the station is obtained from a receiver which measures the distance between the ground station and the aircraft, for one-mile offset, the aircraft will be immediately above the station if it is flying at a one-mile altitude above the ground. In order to correct for this slant range error, 41.4 percent of the distance indicated derived from the DME portion of the station would have to be added.

Prior art systems attempting to correct for slant range have utilized altitude by:

(1) Subtracting the square of the altitude from the square of the hypotenuse (the distance measured by the DME) and extracting the square root.

(2) Deriving the angle of the vertical with the hypotenuse and determining the base line of the triangle by trigonometry.

Both of these methods vary in accuracy with the proximity to the station; that is, the sharpness of the vertical angle, and course sensitivity is a variable which approaches infinity directly above the station.

Both of these methods also require that altitude data which is normally derived from pressure altitude, be corrected to the station's altitude above sea level and for barometric pressure variations.

It is an object of the present invention to provide means wherein the slant range correction can be obtained from the received radio signals.

An aircraft proceeding along any parallel track approaching a point opposite the station, cuts through lines of angular position with respect to radials of the station, and the change of the radial lines will have maximum angular velocity as the aircraft passes through a reference point directly opposite to the station. As the aircraft proceeds along this chosen parallel track, the angular velocity of the VOR radials will vary at a trigonometric ratio. If the parallel track is moved closer to the station it can be observed that the angular velocity relative to the station increases as a function of the distance from the station. However, variations of altitude do not affect the angular velocity relative to the station.

Another parameter which may be obtained from the DME and used to modify the slant range is the ground speed with respect to the station and the velocity of the aircraft. As an aircraft is flown directly over the station, the indicated ground speed derived from the DME will drop to zero, whereas, actually the velocity of the aircraft remains constant. The ratio of these velocities vary with altitude above the ground as the aircraft approaches the station. In the present invention, slant range correction is made without the use of the aircraft's altitude.

With existing airborne equipment, during the flight past a radio station (VOR) from which the aircraft is receiving its slant range and bearing or radial angle, there is a pronounced deviation from the desired or assumed flight path. The effect is the station tends to "pull" the aircraft toward it. This is a result of using the slant range (SR) determined by the DME for the horizontal range (Rho) from the station.

Typically, the pilot uses the SR and radial angle to locate his position on a map. When the distance is much greater than his altitude ($h$), there is little error in this since $$SR = \sqrt{(\text{Rho})^2 + h^2} \approx \sqrt{(\text{Rho})^2} = \text{Rho}$$

However, as he approaches the station, Rho becomes smaller with respect to $h$ and the error becomes significant.

$$\text{error} = (\sqrt{\text{Rho}^2 + h^2} - \text{Rho})$$

Each point in his desired track has a certain horizontal range and bearing from the station. Since the SR is being used for Rho, as the aircraft gets nearer the station, the course is changed to insure that the aircraft "stays on its track." In reality, the aircraft is leaving the track and flying toward the station to reduce the SR for the given radial to correspond with Rho at that radial on the desired track. In the case where the closest point of approach (CPA) of the desired track to the station (or offset) is the same as the altitude, the actual track will deviate from the desired track and pass directly over the station.

Figures 2, 3:
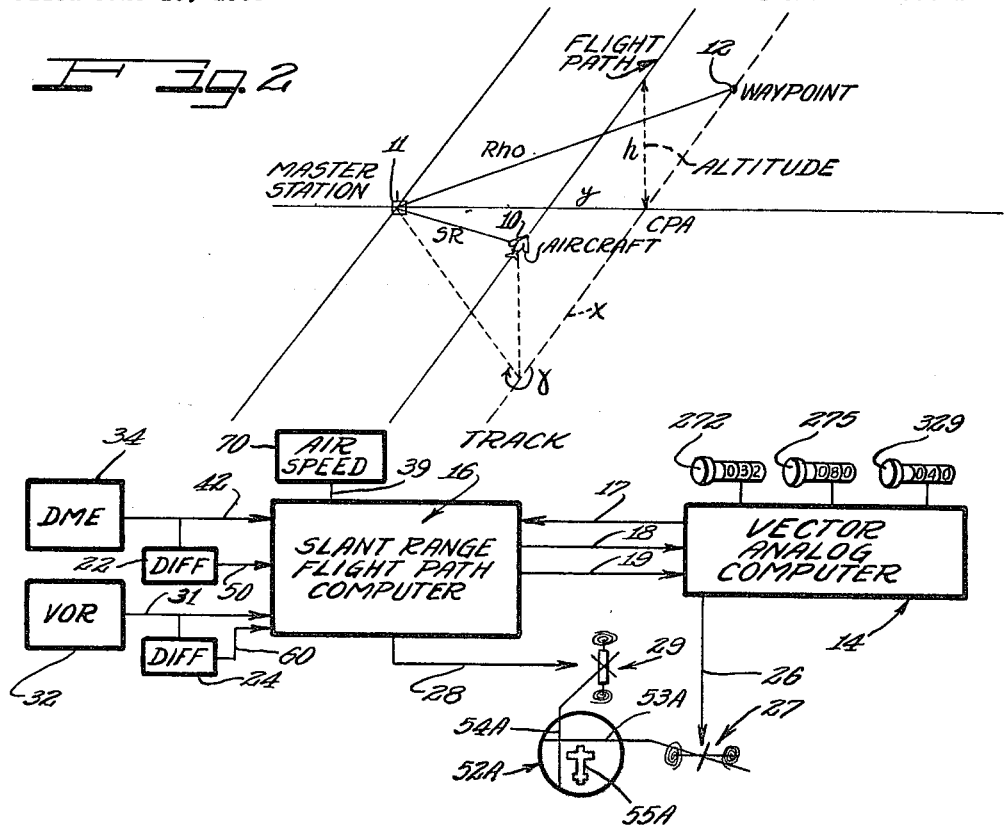
FIGURE 2 is a representation of an aircraft flying relative to a ground station.
FIGURE 3 is a block diagram illustrating the navigation computer of the present invention which corrects for slant range errors.

In FIGURE 2 the desired track passes the VOR station $y$ miles away (distance to CPA). The horizontal range Rho of any point on the track is:

$$\text{Rho} = \sqrt{x^2 + y^2}$$

where:

$x =$ distance along track from CPA
$x < 0$ on approaching CPA
$x > 0$ on departing CPA The flight path is a distance $h$ above the track.
The SR for any point along this flight path is:

$$SR = \sqrt{X^2 + Y^2 + h^2} = \sqrt{\text{Rho}^2 + h^2}$$

The radial angle at any point along the track or flight path is related to the $\text{Tan}^{-1}(y/x)$, $\text{Tan}^{-1} y/x =$ radial angle $+180°-$ course of aircraft $= \gamma$.

If one were to fly down the desired track and *not* be affected by the slant range error phenomenon he could verify certain properties about that path. For example, the rate of change with respect to time of the slant range (SR) and of the radial angle would be:

$$\frac{d(SR)}{dt} = \left[\frac{x\,dx}{dt} + \frac{h\,dh}{dt} + \frac{y\,dy}{dt}\right] \frac{1}{SR}$$

and $$\frac{d}{dt}[\text{radial angle}] = \frac{d}{dt}[\text{Tan}^{-1}(y/x)] = \frac{d\gamma}{dt}$$

$$\frac{d\gamma}{dt} = -\frac{1}{y} \sin^2 \gamma \frac{dx}{dt}$$

If the aircraft maintains a constant altitude and the CPA to the station are held constant, then $$\frac{dy}{dt} = \frac{dh}{dt} = 0$$

and $$\frac{dx}{dt} = \text{velocity or speed}$$

Equation I $$\frac{d(SR)}{dt} = \frac{x(dx)}{SR(dt)} = \frac{1}{SR}\left(\frac{y}{\text{Tan }\gamma}\right)V$$

Equation II $$\frac{d\gamma}{dt} = \frac{-V}{y} \sin^2 \gamma; \; y \neq 0$$

$y > 0$ when $180 < \gamma < 360$
$y < 0$ when $0 < \gamma < 180$

It should be noted that these two parameters, $dSR/dt$ and $d\gamma/dt$, are independent of $h$ (altitude).

These relationships can be used to generate corrections to insure flight down desired track.

FIGURE 2 illustrates an aircraft 10 which is to be flown to a waypoint 12 by utilizing the radio facilities at a station 11. The aircraft has an altitude $h$. The waypoint 12 has coordinates of Rho and $\theta$, with Rho being the distance between the waypoint 12 and the station 11, and $\theta$ being the bearing of the waypoint from the station. The CPA is the closest point of approach of the aircraft to the station and $y$ is the offset which is equal to the distance between the station and the closest point of approach to the station. X is he distance along the track. $\gamma$ is equal to the radial angle $+180°$ minus the track angle.

FIGURE 1 illustrates a vector analogue computer which is shown and described in patent application Ser. No. 559,650, filed May 31, 1966 entitled "Aircraft Navigation System." In such system, a distance measuring receiver 34 and a VOR receiver 32 are utilized to indicate the distance to and the track to a waypoint which is set in by the distance knob 272 and the bearing knob 275, as described in detail in the copending application.

FIGURE 1 illustrates a complete aircraft navigation system 200 combining many of the features of the systems described above in a computer-operated apparatus for navigation by rectilinear coordinates. In navigation system 200 the variable tap 214 of a DME receiver potentiometer 213 is coupled through a transformer 231 to the stator winding 232 of a rotary AC resolver, identified in the drawing as a received data resolver 233. Resolver 233 is of conventional construction and includes the usual pair of quadrature rotor windings 234 and 235. A second stator winding may be included, in accordance with usual practice, but is not used in the received data resolver 233 and hence has not been illustrated.

As in some of the devices described above, the VOR receiver 32 that is incorporated in navigation system 200 drives a synchro differential 61 that is a part of the omnibearing indicator of the receiver. The differential 61 is electrically connected to the three stator windings 236, 237 and 238 of a conventional control transformer 239. One terminal of the rotor winding 241 of control transformer 239 is connected to system ground. The other terminal of winding 241 is connected through a series resistor 242, a capacitor 243, and a further series resistor 244 to a servo amplifier 245. A capacitor 246 may be connected in parallel with rotor winding 241.

The output of servo amplifier 245 is connected to one terminal of a first field winding 247 of a servomotor 248, the other terminal of winding 247 being connected to system ground. Motor 248 is a conventional two phase servomotor and includes a quadrature stator winding 249 and a rotor 251 that is inductively coupled to both of the windings 247 and 249. The quadrature winding 249 of motor 248 is connected to a suitable AC power supply 252 which may comprise the conventional 26 volt, 400 cycle supply available in most aircraft. The rotor 251 of the servomotor is mechanically connected to the rotor of the received data resolver 233, comprising windings 234 and 235, and is utilized to control the angular position of the resolver rotor relative to the stator winding 232 as described more fully hereinafter.

The rotor 251 of servomotor 248 is also mechanically coupled in driving relation to the rotor 253 of a tachometer generator 254. Generator 254 is a conventional AC rate generator, and comprises two stator windings 255 and 256 arranged in spaced quadrature relation to the rotor 253, to which both windings are inductively coupled. Winding 255 comprises the input winding of the tachometer generator and is electrically connected to the AC supply 252 and to a warning circuit unit 257 described more fully hereinafter. Stator winding 256 is the output winding of the tachometer generator.

One terminal of output winding 256 is connected to system ground. The other terminal is connected through a series capacitor 258 and a series resistor 259 to the common terminal 261 of the resistor 242 and the capacitor 243 in the input circuit to servo amplifier 245. This circuit affords a negative feedback circuit from tachometer generator 254 back to the input of servo amplifier 245. Preferably, a parallel RC circuit comprising a capacitor 262 and a resistor 263 is connected in shunt with winding 256 to provide for phase and amplitude adjustment of the generator output.

Navigation system 200 further includes a way point bearing resolver 264 that is essentially a duplicate of the received data resolver 233. Thus, resolver 264 comprises a stator winding 265 and two rotor windings 266 and 267 that are arranged in space quadrature with respect to each other. Again, in the normal commercial form resolver 264 would include a second stator winding but this winding is not used and hence has not been illustrated in the drawing.

The stator winding 265 of the way point bearing resolver 264 is coupled through a transformer 268 to the movable tap 269 of a potentiometer 271. The tap 269 of potentiometer 271 is manually adjustable by suitable means generally illustrated by the distance setting knob 272. The knob 272, or other setting means is calibrated to adjust potentiometer 271 for varying radial distances from the navigation station to a selected way point. The potentiometers 213 and 271 are connected through a trimming potentiometer 273 to a scale factor control 274. The scale factor control 274 comprises a multi-tap connection to the AC supply 252 to modify the amplitude of the AC voltage supplied to potentiometers 213 and 271 to achieve different scale settings for navigation system 200.

Means are also provided for manually adjusting the angular position of the rotor of resolver 264 relative to its stator. In FIG. 1, this arrangement is shown in simplified form and comprises a bearing setting knob 275 that is mechanically connected to the resolver rotor. With respect to both of the manually adjustable setting knobs 272 and 275, it should be recognized that appropriate servo mechanisms or other indirect linkages may be employed instead of the simple manual drives illustrated, if desired.

The rotor windings 234 and 235 of the received data resolver 233 and the rotor windings 266 and 267 of the way point bearing resolver 264 are connected together in the input of a track resolver 277. Thus, one terminal of rotor winding 267 of resolver 264 is connected to system ground and the other terminal is connected to one end of the received data resolver winding 234, the other terminal of winding 234 being connected to a first stator winding 278 in track resolver 277. The stator winding 278 is returned to system ground to complete the circuit. A similar circuit arrangement connects the rotor winding 266 of way point bearing resolver 264 in series with the received data resolver winding 235 to a second quadrature stator winding 279 for the track resolver 277.

The rotor of track resolver 277, like the rotors of the resolvers described above, comprises two quadrature windings 281 and 282. One terminal of winding 281 is connected to system ground. The other terminal of this track resolver rotor winding is connected to an amplifier 283 which in turn is coupled to a detector circuit 284. Similarly, one terminal of resolver winding 282 is connected to system ground and the other terminal is connected through an amplifier 285 to a detector circuit 286. The two detector circuits 284 and 286 provide individual drive signals for a combined linear deviation indicator instrument 52A.

In the rectilinear situation indicator 52A, incorporated in system 200, the vertical movements of the horizontally extending distance indicator line 53A are effected by an appropriate meter movement or "motor" generally represented in FIG. 1 by the resistor 291. A resistor has been shown because devices of this kind ordinarily are substantially resistive in their impedance characteristics. The meter movement 291 is coupled to the detector 286 by means of a limiter circuit 292. The limiter circuit comprises a pair of diodes 293 and 294 connected in opposed polarities in shunt relation to the output terminals of detector 286. Circuit 292 further includes a series resistor 295 and a shunt capacitor 296. It is thus seen that the circuit 292 is, essentially, a resistance-capacitance integrating circuit which also serves to limit the amplitude of the signal that is integrated and supplied to the meter movement 291.

The meter movement or other appropriate "motor" that controls the position of the vertically extending linear displacement indicator line 54A in the rectilinear situation indicator 52A is represented, in FIG. 1, by the resistance 297. The "motor" 297 is electrically connected to the detector circuit 284 by a response rate limiting circuit 298 that is generally similar to circuit 292.

Thus, circuit 298 includes two diodes 299 and 301 that are connected in shunt relation to the output terminals of detector 284 but in reversed polarities relative to each other. Circuit 298 further includes a series resistor 302 and a shunt capacitor 303 affording a resistance-capacitance integrating circuit. In addition, however, circuit 298 includes a second capacitor 304 that is substantially larger than capacitor 303. Capacitor 304 may be connected in parallel relation with capacitor 303, or may be disconnected from the circuit, by operation of a switch 305.

Returning to track resolver 277, it is seen that the rotor of this resolver, comprising windings 281 and 282, is mechanically connected to the rotor 311 of a servomotor 312. Servomotor rotor 311 is also used to drive the rotor 313 of a control transformer 314. The rotor winding 313 of control transformer 314 is connected back to the control winding 315 of servomotor 312 through an amplifier 316 to complete a null-seeking servo circuit. The quadrature input winding 317 of servomotor 312 is connected to the AC supply 252.

The primary of control transformer 314 comprises the windings 321, 322 and 323, each having one terminal common with the others. Windings 321, 322 and 323 are individually connected to the secondary windings 324, 325 and 326, respectively, of a synchro transmitter 328. Windings 324–326 are electrically connected to each other to complete the synchro circuit. The primary winding 327 of synchro transmitter 328 is electrically connected to the AC supply 252. Winding 327 is the rotor winding for the synchro transmitter and is mechanically connected to a course setting means represented by a knob 329. The control knob or other setting means 329 is also mechanically connected to the RSI instrument 52A for setting of the course that appears in the window 58A of the instrument. In normal practice, the setting knob 329 is located immediately adjacent the instrument 52A for the convenience of the pilot.

Considering operation of the complete aircraft navigation system 200, perhaps the best starting point is the VOR receiver 32. The VOR receiver is mechanically coupled to an appropriate synchro differential 61, which may be a part of the OBI instrument of the aircraft. The VOR receiver is connected to the secondary of the synchro differential, the primary being connected to an appropriate fixed transmitter (not shown). The output signals from differential 61, representative of received bearing signals as derived by VOR receiver 32, are supplied to the input windings 236–238 of control transformer 239.

Whenever the rotor of control transformer 239 is not exactly aligned with the primary windings of the control transformer, as when a change in bearing has occurred, an error signal is produced in rotor winding 241 and is applied to the control winding 247 of servomotor 248 through the coupling circuit comprising resistor 242, capacitor 243, resistor 244, and amplifier 245. The resulting rotation of the servomotor rotor 251 repositions the rotor 234, 235 of the received data resolver 233. Thus, the angular orientation of the received data resolver rotor is continuously maintained at a position indicative of the bearing of the aircraft as derived from the signals from VOR system 32.

The mechanical coupling from servomotor rotor 251 to tachometer generator rotor 253 causes the tachometer generator to develop an output signal whenever the servomotor rotates. The signal from tach generator 254 is coupled back to motor amplifier 245 in a negative feedback circuit comprising capacitor 258 and resistor 259. The negative feedback circuit functions to limit the response rate of the servomotor and thus effectively damps changes in the angular position of the received data resolver 233. Accordingly, the tachometer generator feedback circuit reduces the effect of high-amplitude short-duration perturbations in the received VOR signals, much like a low-pass filter, enhancing both the usability and the accuracy of the information derived from those signals and represented ultimately by the angular positioning of received data resolver 233. It will be recognized that the mechanical connection from motor rotor 251 back to control transformer rotor 241 affords a null-seeking servo arrangement, like those described above, in which the rotational movement of the servomotor is interrupted as soon as the control transformer rotor is re-positioned in an alignment corresponding to changed signal amplitude conditions in the control transformer primary.

In addition to the bearing information supplied to the received data resolver 233 by means of the angular positioning of the resolver rotor 251 of servomotor 248, it is also necessary to apply distance information to the resolver. This is accomplished by the connection from the DME receiver 34 to the potentiometer 213. Thus, the amplitude of the input signal supplied to the stator winding 232 of resolver 233 is proportional to the distance of the aircraft from the navigation system. This being the case, it can be shown that the output signal on one of the windings 234 and 235 is of the form $R' \sin \theta'$, where $R'$ represents the distance of the aircraft from the navigation system as derived from DME receiver 34 and $\theta'$ represents the bearing angle relative to magnetic north at the station as derived from the VOR receiver 32. Resolver 233 thus constitutes an R-$\theta$ computer.

The way point bearing resolver 264 functions in precisely the same manner as received data resolver 233, but on the basis of the distance of the navigation station from a predetermined distant way point and bearing of the way point relative to magnetic north at the station. The pilot selects a given way point to which he wishes to fly, a point that is within reception distance of the signal from the VORTAC station to which receivers 32 and 34 are tuned. The distance setting means 272 is adjusted to the distance $R''$ from the station to the selected way point. As a consequence, a signal having an amplitude proportional to that distance is supplied to the input winding 265 of way point bearing resolver 264. The bearing relative to the selected way point (angle $\theta''$) is fed into the resolver by adjusting the bearing setting means 275, rotating the resolver secondary 266–267 to an orientation representative of this bearing. Consequently, the amplitudes and phase relations of the signals induced in windings 266–267 are representative of the rectilinear coordinates of the way point with respect to the navigation station. That is, resolver 264 functions as an R-$\theta$ computer with respect to the way point location.

The east-west coordinate signals from resolver 233 and 264 could be subtracted from each other, in an appropriate electrical circuit, to develop a signal indicative of the displacement of the aircraft from the direct path to the way point in this coordinate direction. Similarly, the north-south coordinate signals from the two resolvers could be subtracted to develop a deviation signal representative of the difference between the way point bearing data and the actual bearing data in that direction. But this information would still be in arbitrary north-south and east-west coordinates and a display of the information would present substantial difficulties with respect to scale factor of the indicator means 52A.

In the computer system 200, the two sets of coordinate signals developed in the received data resolver winding 234 and the way point resolver 267 are effectively subtracted from each other by means of the series connection of those windings, so that the signal supplied to the input winding 278 of track resolver 277 constitutes a difference signal representing deviation along one coordinate axis. Similarly, the combined signal from winding 235 and 266 that appears across the input winding 279 of the track resolver represents a difference signal related to the other coordinate axis. But further resolution of these signals is required before application to the indicator means 52A.

Thus, it is highly desirable to have display 52 oriented, in terms of the indication given to the pilot, along the track or path to be actually followed by the aircraft. More importantly, it is desirable to orient the display along the track to permit expansion of the scale factor of the indicator means to a maximum to give closer control of deviations from the track. To accomplish this end, the rotor 281, 282 of track resolver 277 is oriented, by the pilot, to a position representative of the actual bearing along which the aircraft will fly to the way point. The pilot adjusts the adjusting means 329 $\phi$ orient the rotor 327 of synchro transmitter 328 to a position representative of the desired bearing. The requisite angular information is transmitted to control transformer 314, which drives servomotor 311 until the servomotor re-orients the rotor 313 of the control transformer at a null position. The angular movement of the servomotor rotor 311 effectively re-positions the track resolver rotor 281, 282 at the desired position representative of the orientation of the flight path.

The coordinate rotation function of track resolver 277 can perhaps best be understood by reference to the aircraft flying along the selected track to a way point. The initial information relative to the position of aircraft is developed, in received data resolver 233, on the basis of the east-west and north-south coordinate X1 and Y1. The track resolver 277 operates effectively to rotate the coordinate system so that the information ultimately presented to the indicator means by which the pilot navigates is expressed in terms of the rotated coordinates X2 and Y2. It is seen, therefore, that the track resolver has a dual function; it operates to sum up the way point bearing information from resolver 264 and the current position data from resolver 233, and at the same time rotates the information from those two resolvers to produce output signals in a coordinate system oriented along the prjected track of the aircraft.

The signal developed in winding 281 of track resolver 277 is directly representative of the lineal displacement of the aircraft to the left or to the right of the selected track to the way point or destination toward which the aircraft is moving. This signal, after amplification in circuit 283 and detection in circuit 284, is supplied to the meter movement or motor 297 that drives the left-right indicator 54A instrument 52A. The signal supplied to the "motor" 297 is a DC signal, the amplitude of the required movement being represented by the amplitude of the signal and the direction of movement by the polarity of the signal.

The rate of response of motor 297, and hence the rate of movement of indicator 54A, is limited to a pre-selected maximum by the limiter circuit 298. The two diodes 299 and 301 effectively set a maximum limit for the amplitude of the signal; typically, if silicon diodes are employed, this limit is established at about 0.6 volt whereas if germanium diodes are utilized the signal amplitude limitation is of the order of 0.3 volt. For any input signal equal to or exceeding this amplitude limitation, the signal supplied to motor 297 is the time integral of the received signal at an integration rate established by the size of the capacitors 303 and 304 and the impedance of the resistor 302. For normal enroute flight, switch 305 is closed so that the capacitor 304 is effective in the integrating circuit.

Limiter circuit 298 should be constructed or adjusted to fit the normal operating speed range of the aircraft in which it is installed. This can be accomplished by specific selection of resistor 302 and capacitors 303 and 304 to provide an integration rate, and hence a response rate, correlated to the maximum speed of the aircraft. On the other hand, a standardized unit may be constructed for use in all aircraft, in which case the resistor 302 or the capacitor 304, or both, may be adjustable devices, permitting adjustment of the limiter circuit to meet the actual navigation requirements of the aircraft.

It will be apparent that limiter 298 functions by establishing a maximum response speed for the left-right deviation indicator means 54A in instrument 52A. Because the signal information that is translated into movements of indicator 54A is in terms of lineal displacement, regardless of the angular position of the aircraft with respect to the navigation station, movements of indicator 54A are always in trems of aircraft movements in miles per hour. Thus, establishment of a fixed maximum rate of response for the indicator 54A automatically and inherently limits the instrument response rate in accordance with the actual navigation requirements of the aircraft, so long as the maximum limit is properly related to the speed of the aircraft.

The control arrangement for the to and from indicator 53A of instrument 52A is essentially similar to that for the left-right deviation indicator 54. Thus, the output signal from track resolver winding 282 is amplified in circuit 285 aind detected in circuit 286. The resulting DC signal is supplied through limiter 292 to the meter movement or motor 291 in the RSI instrument. Again, the two diodes 293 and 294 establish a fixed maximum for the signal supplied to the indicator means. Moreover, this signal is integrated, with respect to time, for signal levels above the maximum, in the RC integrating circuit 295–296. By proper selection of capacitor 296 and resistor 295, relative to the voltage characteristics of diodes 293 and 294, the limiter circuit effectively establishes a maximum response rate for movements of the to-from indicator means 53A that is directly correlated to the navigational needs of the aircraft.

It should be noted that the RSI indicator 52A affords a representation that is reversed relative to the pictorial display indicator 52. Thus the intersection of indicators 53A and 54A represents the way point toward which the aircraft moves. The central indicator element 55A represents the aircraft. Member 55A may be connected to the aircraft compass for rotation to indicate the heading of the aircraft.

In the computer navigation system 200, it is significant that "smoothing" of the bearing data from VOR receiver is carried out in two places in the circuit. The initial smoothing or filtering action occurs in the servo loop comprising control transformer 239, servomotor 248, and tach generator 254. This "pre-encoding" smoothing or filtering of the relatively short-duration high-amplitude transients frequently present in the output of VOR receiver 32 is quite desirable, substantially enhancing the usability of the bearing information supplied to received data resolver 233. But the pre-encoding smoothing of the bearing signal information is accomplished without reference to displacement from the navigation station and without specific reference to the speed range of the aircraft and hence does not realize the full advantages of the present invention. As an alternative way of obtaining distance proportional filtering, the output of DME receiver 34 may be connected to the tach generator 254 rather than to wiper 214.

The second smoothing or filtering operation accomplished in limiters 292 and 298 is directly correlated with the aircraft speed range and with the displacement of the aircraft from the navigation station. In theory, the response rate limitations imposed by the response rate control means 292, 298 is sufficient to achieve the desired enhancement of accuracy and usability of the bearing data. In practice, the system illustrated, with some smoothing accomplished prior to encoding in the data resolver 233 and some accomplished afterward, tends to produce more consistent and accurate results.

During the time in which the aircraft flies down the selected track to a particular waypoint, capacitor 304 remains connected in limiter circuit 298. At the first waypoint on a flight, however, the pilot must re-set system 200 for a further waypoint and, usually, must encode the system to a different VORTAC station. The time delay in response of the left-right indicator 54A that is caused by the presence of capacitor 304 in the circuit may be too great to allow for easy adjustment of the system by the pilot. With capacitor 304 in the circuit, it may take as much as ten to twenty seconds for system adjustment, whereas the delay should be held to five seconds for system adjustment, whereas the delay should be held to five seconds or less to enable the pilot to complete encoding in a reasonable and expeditious manner. It is for this reason switch 305 is provided, permitting the pilot to disconnect capacitor 304 and thereby achieve a marked increase in the response rate of the RSI instrument, and particularly indicator 54A, when setting the system for a new waypoint or course. Switch 305 is also opened to increase the response rate when the aircraft is maneuvering in a terminal area, to permit more rapid response of the instrument for landing approach purposes.

The rectilinear situation indicator 52A, as actuated by the system 200, comprises two individual indicator means, both of which indicate course deviations of the aircraft and both of which utilize, in part, both the original bearing signal developed by VOR receiver 32 and the distance signal from DME receiver 34. Thus, the indicator element 53A is ordinarily controlled, in substantial part, by the bearing signal as well as the distance signal, since the computer portion of system 200 requires both signals to resolve the relative position of the aircraft into rectilinear coordinates and to present the same on the basis of the predetermined track set into resolver 277. Thus, correction and compensation for erratic excursions in both navigation signals is important with respect to both of the indicator means 53A and 54A of device 52A, and it is for this reason that the two control means 292 and 298 for limiting the maximum response rate of the indicator means are incorporated in the system.

In selecting the limiting maximum rate of response for the indicator instrument or other indicator means in any of the systems described above, a determining factor is the maximum operating speed of the aircraft. However, the limiting response rate for the instrument or other indicator means should not be selected to be actually matched to the maximum speed of the aircraft. For example, if the full scale width of the display field for instrument 52A is set to be equal to four miles, by scale factor setting 274, and the maximum speed of the aircraft is four miles per minute, the response rate for indicator 54A should not be limited to a rate that will require a full minute for the indicator element to traverse the full width of the instrument. Instead, a maximum rate representative of a somewhat higher aircraft speed should be selected, to permit effective operation of the aircraft navigation system when the aircraft has a tailwind of reasonable magnitude. For high-altitude high-speed aircraft, such as jet aircraft capable of speeds in excess of six hundred miles per hour, which may operate in a jetstream, the maximum response rate for the indicating means should be equivalent to the maximum speed of the aircraft plus an additional increment of the order of one hundred fifty miles per hour to permit effective operation with a jetstream tailwind. For lower speed aircraft restricted to operation at lower altitudes, a smaller additional increment can be added to the actual maximum aircraft speed in determining the limiting rate for instrument response.

System 200 includes a warning circuit 257 that is connected to the input winding 255 of tachometer generator 254. Warning circuit 257 is also connected to the rotor winding 241 of control transformer 239, through an amplifier 331. In addition, electrical connections are provided from DME receiver 34 and VOR receiver 32 to warning circuit 257.

FIGURE 3 illustrates, in block form, the system of this invention which corrects for the slant range error and comprises a vector analogue computer 14 similar to the one shown in FIGURE 1 and which has a Rho input shaft 272, a θ input shaft 275, and a track angle setting knob 329.

A slant range flight path computer, designated generally at 16, receives an offset input signal on a lead 17 from the vector analogue computer 14 and supplies a slant range signal on a lead 18 to the vector analogue computer and supplies a radial angle to the vector analogue computer on a lead 19. The DME receiver 34 supplies an input to slant range computer 16 on lead 42 and also supplies an input to a differentiator 22 which supplies an input to slant range computer 16 on lead 50.

The VOR receiver 32 supplies an input to the slant range computer 16 on lead 31 and also supplies an input to the differentiator 24 which supplies an input to the slant range computer 16 on lead 60.

The vector analogue computer 14 supplies a distance-to-go signal on the lead 26 to meter movement 27 which controls the indicator 53A that moves vertically on the indicator 52A relative to the aircraft 55A.

The slant range flight path computer 16 produces an off-course signal on a lead 28 which is fed to a meter movement 29 that moves an indicator 54A that indicates the orientation of the aircraft relative to the track.

FIGURE 4 is a more detailed view of the vector analogue computer 14 connected to the slant range flight path computer 16. In this view the vector analogue computer, illustrated in FIGURE 1, has been modified, as shown in FIGURES 3 and 4, to connect it to the slant range computer 16 to eliminate the slant range error.

The VOR receiver 32 has had its output shaft disconnected from the OBI differential 61 and an electrical input is supplied from the VOR receiver by lead 31 to the slant range flight path computer 16. The differentiator 24 also receives any electrical input from the receiver 32 and supplies an input to the slant range computer 16 on lead 60. The slant range computer provides an electrical input through lead 19 to a converter 36 which converts the electrical input signal to a shaft position and supplies it by shaft 37 to position the OBI differential 61. The secondary waypoint resolver 401 and the secondary track resolver 402 have been added to generate a signal to be fed into amplifier 285 instead of the signal generated by resolver winding 282. The output from the detector 286 feeds through the circuit 292 and is connected by lead 17 to the input of slant range computer 16. An output is supplied to lead 28 which drives the meter movement 291 that controls the indicator 54A of indicator 52A.

The DME receiver 34 is disconnected from the wiper contact 214 and is electrically connected to the slant range flight path computer 16 by lead 42. An output from the DME receiver is also supplied to the differentiator 22 which supplies an input to the slant range flight path computer 16.

An output is supplied from the computer 16 through lead 18 to a servo system 46 which has an output shaft 47 that positions the wiper contact 214.

The slant range flight path computer is shown in detail in FIGURE 5. It receives an input from the vector analogue computer 14 on lead 17, an input from the DME receiver 31 on lead 42, an input from the differentiator 22 on the lead 50, an input from an airspeed device 70 on lead 39, an input from the VOR receiver 32 on lead 31, and an input from the differentiator 24 on lead 60. The flight path computer provides an output on lead 19 to the converter 36 which positions the OBI differential 61 through shaft 37, and provides a second output on lead 28 which is an offcourse signal that drives the meter movement 29 of the indicator 52A.

As shown above, the correct radial angle and offcourse signal are computed from Equations I and II.

The portion 71 of the FIGURE 5 in the upper part of the drawing solves Equation II for the rate of change of radial angle with respect to time. The portion 72 solves for the rate of change of slant range with respect to time.

An adder 100 receives an input on lead 60 of the rate of change of the radial angle and supplies an output to an integrator 101. A second added 102 receives the output of integrator 101 and an input through lead 31 from the VOR receiver 32. The signal out of the adder 102 is proportional to the radial angle. A sine square function generator 103 receives the signal from adder 102 and converts it to an output proportional to the sine squared of radial angle.

An inverter 104 receives an input signal from the airspeed transducer 70 on lead 39 and converts it into any negative voltage to produce a signal proportional to the negative velocity.

An amplifier 107 receives the offset signal from lead 17 and produces an output which is the reciprocal of the input signal. A multiplier 108 receives signals from inverter 104 and reciprocal generator 107 and multiplies them together. A multiplier 109 receives the output of the multiplier 108 and an input from the sine squared function generator 103 and multiplies them together to produce a signal proportional to the rate of change with respect to time of the radial angle. This signal is supplied by lead 111 to the input of the adder 100. The output of the adder 102 is connected to lead 19 and is proportional to the corrected radial angle.

The offcourse signal is computed by the portion 72. It comprises an adder 112 which receives the time derivative of the slant range signal on lead 50 from the differentiator 22 and provides an output to the integrator 113. An adder 114 receives the output of integrator 113 and a slant range signal through lead 42 from the DME receiver 34.

A tangent function generator 116 receives an input from the adder 102 which is proportional to the radial angle and produces an output which is proportional to the tangent of the radial angle. A multiplier 117 receives the output of the tangent function generator 116 and the output of the adder 114, to produce an output which is proportional to the slant range times the tangent of the radial angle. A reciprocal generator 118 receives the output of the multiplier 117 and produces an output equal to one over the slant range multiplied by the tangent of the radial angle. A multiplier 119 receives the output of the reciprocal generator 118 and an input from the airspeed device 70 on lead 39 and an input from the detector 286 on lead 17. The multiplier 119 multiplies the three input signals together and produces an output which is equal to the derivative of the slant range with respect to time. This output is supplied by lead 121 to the input of adder 112. Lead 28 supplies the offcourse signal to the indicator 52 to move the meter movement 54A from the output of integrator 113.

Thus, the slant range flight path computer 16 illustrated in FIGURE 5 corrects for slant range. The various operational amplifiers and function generators are well known to those skilled in the art. For example, pages 19–2 to 19–21 of "Waveforms" by Chance et al., M.I.T. Radiation Lab Series, vol. 19, chapter 2, published by McGraw Hill Book Co. illustrates many of the function generators used in computer 16. The sine squared function may be obtained by obtaining the sine function two times and multiplying the results together. The tangent function may be obtained by obtaining the sine and cosine function and dividing the results.

Computers may also be used which calculate functions from series. For example, a digital computer has been used to simulate actual flight conditions.

FIGURE 6 illustrates how differential Equations I and II effectively correct for the slant range error E. Numeral 11 repersents a ground station being used by an aircraft for navigation purposes. Due to the aircraft's altitude above the ground station, the slant range SR computed by the aircraft's navigation system without the present invention will position the aircraft to the point labelled "Actual Path Flown without Correction." A system utilizing the present invention calculates a point below the aircraft which has the same distance from the station as the slant range SR to the "Actual Path Flown without Correction" and determines the aircraft's position as a point above this ground position. The point labelled "Desired Path and Path Flown with Correction" indicates the aircraft's position with the present invention. The slant range error is indicated as E and equals the horizontal distance between the "Actual path Flown without Correction" and "Desired Path and Path Flown with Correction."

I claim as my invention:

1. An aircraft navigation system for flying offset courses from a radio transmitter and which corrects for slant range errors without using an altitude input signal comprising:
    an offset course computer with input means for setting the coordinates of a desired waypoint and the desired track angle,
    a slant range flight path computer receiving an offset signal from said offset course computer and supplying a corrected slant range signal and a corrected radial angle to said offset course computer,
    an implementation means receiving an off course signal from the slant range flight path computer and a distance-to-go signal from the offset course computer,
    a distance measuring receiver supplying an input to said slant range computer,
    a VOR receiver supplying an input to said slant range computer, and
    a velocity transducer supplying an input to said slant range computer.

2. An aircraft navigation system according to claim 1 comprising a first differentiator receiving an input from said instance measuring receiver and supplying an input to the slant range computer, and a second differentiator receiving the output of the VOR receiver and supplying an input to the slant range computer.

3. An aircraft navigation system according to claim 2, wherein said slant range flight path computer includes a radial angle computer that comprises, a first adder receiving an input from the second differentiator, an integrator which receives the output of the first adder, a second adder which receives the output of the VOR receiver and the output of the integrator, a rate of change of radial angle computer receiving the output of the second adder and supplying an output to the first adder, said rate of change of radial angle computer receiving inputs from the offset computer and the velocity transducer and supplying an input to the first adder proportional to the rate of change of radial angle obtained by solving the equation $$\frac{d\gamma}{dt} = \frac{-V}{y} \sin^2 \gamma$$

where V is the aircraft's velocity, y is the offset and γ is the radial angle minus the track angle plus 180 degrees.

4. An aircraft navigation system according to claim 2, wherein said slant range flight path computer includes an off course and range computer that comprises a third adder receiving an input from the first differentiator, a second integrator which receives the output of the third adder, a fourth adder which receives the output of the second integrator and the output of the distance measuring receiver, a rate of change of slant range computer receiving the output of the fourth adder and inputs from the velocity transducer, the offset course computer and the radial angle computer and supplying an input to the third adder proportional to the rate of change of slant range obtained by solving the equation $$\frac{d(SR)}{dt} = \frac{yV}{SR \tan \gamma}$$

where SR is the slant range.

5. An aircraft navigation system according to claim 4, wherein said implementation means comprises a meter with two visual indicia.

6. An aircraft navigation system according to claim 5, wherein said meter has two cross-pointers with one of the pointers driven by the distance-to-go signal from the offset computer and the other pointer driven by the off course signal from the off course and range computer.

7. An aircraft navigation system according to claim 1, wherein said implementation means comprises a meter with two visual indicia.

8. An aircraft navigation system according to claim 7, wherein said two visual indicia are cross-pointer needles with one needle driven by the off course signal from said slant range flight path computer and the other needle driven by the distance-to-go signal from the offset computer.

9. An aircraft navigation system according to claim 8, wherein said meter has an indicia representative of the aircraft on its face to indicate its position relative to the needles.

10. An aircraft navigation system for flying offset courses from a radio transmitter and which corrects slant range errors without using an altitude input signal comprising, an offset course computer with input means for setting the coordinates of a desired waypoint and the desired track angle, a slant range flight path computer receiving an offset signal from said offset course computer and supplying a corrected slant range signal and a corrected radial angle to said offset computer, implementation means receiving an offset course signal from the slant range flight path computer and a distance to go signal from the offset course computer, a distance measuring receiver supplying an input to said slant range computer, a VOR receiver supplying an input to said slant range computer, a velocity transducer supplying an input to said slant range computer, a first differentiator receiving an input from said distance measuring receiver and supplying an input to said slant range computer, a second differentiator receiving an input from said VOR receiver and supplying an input to said slant range flight path computer, said slant range flight path computer including means for producing an off-course signal comprising a first adder which receives the output of said first differentiator, an integrator which receives the output of said first adder, a second adder which receives the output of the integrator and the output of said distance measuring receiver, a tangent function generator receiving an input proportional to the radial angle relative to the radio transmitter, a first multiplier receiving the outputs of the tangent function generator and the second adder, a reciprocal generator receiving the output of the first multiplier, a second multiplier receiving the outputs of the reciprocal generator, the velocity transducer, and the offset course computer, and supplying an input to the first adder and said integrator producing an off-course signal.

11. An aircraft navigation system for flying offset courses from a radio transmitter and which corrects for slant range errors without using an altitude input signal comprising, an offset course computer wit hinput means for setting the coordinates of a desired waypoint and a desired track angle, a slant range flight path computer receiving an offset signal from said offset course computer and supplying a corrected slant range signal and a corrected radial angle to said offset course computer, implementation means receiving an off-course signal from the slant range flight path computer and a distance to go signal from the offset course computer, a distance measuring receiver supplying an input to said slant range computer, a VOR receiver supplying an input to said slant range computer, a first differentiator connected to the output of said distance measuring receiver, a second differentiator connected to the output of the VOR receiver, a velocity transducer supplying an input to said slant range computer, said slant range flight path computer comprising means for producing a corrected radial angle comprising a first adder which receives an input from said second differentiator, an integrator which receives the output of said first adder, a second adder which receives the outputs of the integrator and the output of the VOR receiver, a sine squared function generator which receives the output of the first adder, an inverter connected to the output of the velocity transducer, a negative generator connected to the output of said offset course computer and producing a signal which is the reciprocal of the output signal, a multiplier receiving inputs from the inverter and the negative generator, a second multiplier receiving the outputs of the multiplier and the sine squared generator and supplying an input to the first adder, and an output proportional to the radial angle supplied by the second adder.

References Cited

UNITED STATES PATENTS

| | | | |
|---|---|---|---|
| 2,540,150 | 2/1951 | Watts | 343—107 |
| 2,943,321 | 6/1960 | Karpeles | 343—107 X |
| 3,414,901 | 12/1968 | Perkins et al. | 343—107 |

RODNEY D. BENNETT, JR., Primary Examiner

T. H. TUBBESING, Assistant Examiner

U.S. Cl. X.R.

343—107

UNITED STATES PATENT OFFICE
CERTIFICATE OF CORRECTION

Patent No. 3,495,241          Dated February 10, 1970

Inventor(s) EARL STUART PERKINS

It is certified that error appears in the above-identified patent and that said Letters Patent are hereby corrected as shown below:

Column 1, line 35, after "pulling" insert a quote --"--.

Column 4, line 48, after "is" change "he" to --the--.

Column 8, line 61, after "329" "∅" should read --to--.

Column 9, line 20, after "54A" insert --in--.

Column 12, line 53, "added" should read --adder--.

Column 13, line 44, "repersents" should read --represents--.

Column 15, line 32, "wit hinput" should read --with input--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents